US012511849B2

(12) United States Patent
Lin

(10) Patent No.: US 12,511,849 B2
(45) Date of Patent: Dec. 30, 2025

(54) METHOD FOR IMPROVING VISUAL QUALITY OF REALITY SERVICE CONTENT, HOST, AND COMPUTER READABLE STORAGE MEDIUM

(71) Applicant: HTC Corporation, Taoyuan (TW)

(72) Inventor: I-Chiao Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 447 days.

(21) Appl. No.: 18/091,371

(22) Filed: Dec. 30, 2022

(65) Prior Publication Data

US 2024/0221332 A1   Jul. 4, 2024

(51) Int. Cl.
*G06T 19/20*   (2011.01)
*G06T 7/50*    (2017.01)
*G06T 11/00*   (2006.01)
*H04S 7/00*    (2006.01)

(52) U.S. Cl.
CPC ............. *G06T 19/20* (2013.01); *G06T 7/50* (2017.01); *G06T 11/00* (2013.01); *H04S 7/30* (2013.01); *G06T 2219/2004* (2013.01)

(58) Field of Classification Search
CPC . G06T 19/20; G06T 7/50; G06T 11/00; G06T 2219/2004; H04S 7/30
USPC ........................................................ 345/419
See application file for complete search history.

(56) References Cited

U.S. PATENT DOCUMENTS

| 2010/0245257 | A1 | 9/2010 | Cragun et al. | |
| 2012/0293489 | A1* | 11/2012 | Chen ..................... | G06T 19/20 |
| | | | | 345/419 |
| 2014/0328505 | A1* | 11/2014 | Heinemann ............. | G06F 3/012 |
| | | | | 381/303 |
| 2018/0192222 | A1* | 7/2018 | De Bruijn ............ | H04N 13/398 |
| 2019/0394607 | A1* | 12/2019 | Laaksonen ............... | H04R 5/04 |
| 2020/0380031 | A1* | 12/2020 | Zhou ...................... | G06T 19/006 |
| 2020/0389755 | A1 | 12/2020 | Laaksonen et al. | |
| 2021/0082196 | A1* | 3/2021 | Richter ................. | G06T 19/006 |
| 2021/0133923 | A1* | 5/2021 | Liao ....................... | H04N 7/147 |
| 2021/0279957 | A1 | 9/2021 | Eder et al. | |
| 2021/0390748 | A1* | 12/2021 | Liao ....................... | G06V 10/82 |

OTHER PUBLICATIONS

"Office Action of Taiwan Counterpart Application", issued on Apr. 10, 2024, p. 1-p. 12.
Angel Xuan Chang, "Text to 3D Scene Generation", Stanford University, Dec. 2015, pp. 1-203.

* cited by examiner

*Primary Examiner* — Jin Ge
(74) *Attorney, Agent, or Firm* — JCIPRNET

(57) ABSTRACT

The embodiments of the disclosure provide a method for improving a visual quality of a reality service content, a host, and a computer readable storage medium. The method includes: generating a first virtual scene, an audio content, and a depth map based on a text, wherein the audio content includes an audio component and the depth map includes depth information; determining a sound attribute corresponding to an audio source based on the audio component and the depth information; adjusting the first virtual scene as a second virtual scene at least based on the sound attribute corresponding to the audio source; determining a 3D audio content at least based on the sound attribute and the audio content; and combining the 3D audio content with the second virtual scene into the reality service content.

20 Claims, 5 Drawing Sheets

METHOD FOR IMPROVING VISUAL QUALITY OF REALITY SERVICE CONTENT, HOST, AND COMPUTER READABLE STORAGE MEDIUM

BACKGROUND

1. Field of the Invention

The present disclosure generally relates to a mechanism for providing a reality service content, in particular, to a method for improving a visual quality of a reality service content, a host, and a computer readable storage medium.

2. Description of Related Art

Generally, the content of virtual reality (VR) applications or the virtual world of the Metaverse are all created manually by people. For example, the environment of the virtual world may be designed by designers, modelled by art workers, and the used music may be composed by musicians. However, the costs of these productions are high, time-consuming and labour-intensive.

SUMMARY OF THE INVENTION

Accordingly, the disclosure is directed to a method for improving a visual quality of a reality service content, a host, and a computer readable storage medium, which may be used to solve the above technical problems.

The embodiments of the disclosure provide a method for improving a visual quality of a reality service content, adapted to a host, including: generating a first virtual scene, an audio content, and a depth map based on a text, wherein the audio content includes a first audio component, and the depth map includes first depth information; determining a first sound attribute corresponding to a first audio source based on the first audio component and the first depth information; adjusting the first virtual scene as a second virtual scene at least based on the first sound attribute; determining a 3D audio content at least based on the first sound attribute and the audio content; combining the 3D audio content with the second virtual scene into the reality service content.

The embodiments of the disclosure provide a host including a storage circuit and a processor. The storage circuit stores a program code. The processor is coupled to the storage circuit and accessing the program code to perform: generating a first virtual scene, an audio content, and a depth map based on a text, wherein the audio content includes a first audio component, and the depth map includes first depth information; determining a first sound attribute corresponding to a first audio source based on the first audio component and the first depth information; adjusting the first virtual scene as a second virtual scene at least based on the first sound attribute; determining a 3D audio content at least based on the first sound attribute and the audio content; combining the 3D audio content with the second virtual scene into a reality service content.

The embodiments of the disclosure provide a non-transitory computer readable storage medium, the computer readable storage medium recording an executable computer program, the executable computer program being loaded by a host to perform steps of: generating a first virtual scene, an audio content, and a depth map based on a text, wherein the audio content includes a first audio component, and the depth map includes first depth information; determining a first sound attribute corresponding to a first audio source based on the first audio component and the first depth information; adjusting the first virtual scene as a second virtual scene at least based on the first sound attribute; determining a 3D audio content at least based on the first sound attribute and the audio content; combining the 3D audio content with the second virtual scene into a reality service content.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
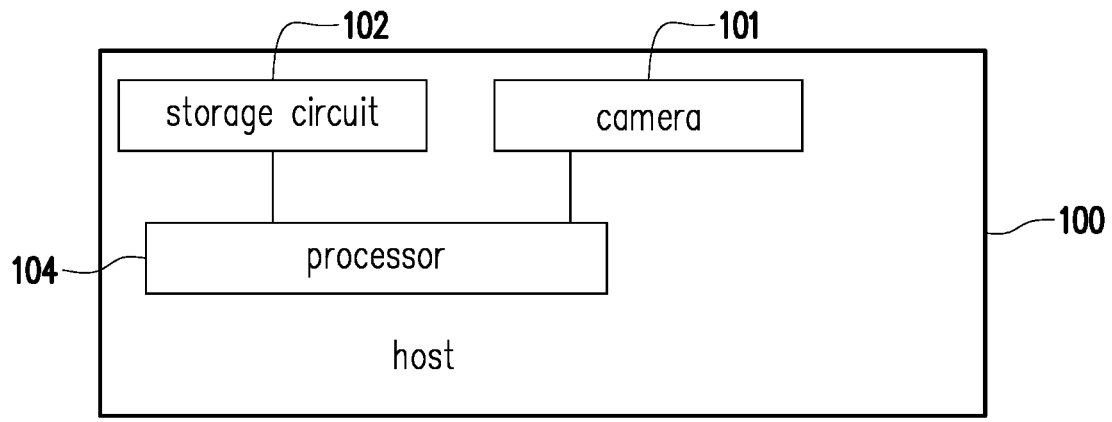
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In various embodiments, the host 100 can be implemented as any smart device and/or computer device. In some embodiments, the host 100 can be implemented as a head-mounted display (HMD) for providing reality services such as a VR service, an augmented reality (AR) service, a mixed reality (MR) service, and the like.

In FIG. 1, the host 100 includes a camera 101, a storage circuit 102, and a processor 104. The camera 101 can be, for example, a front camera of the host 100 for capturing the environment in front of the host 100, but the disclosure is not limited thereto.

The storage circuit 102 is one or a combination of a stationary or mobile random access memory (RAM), read-only memory (ROM), flash memory, hard disk, or any other similar device, and which records a plurality of modules and/or program codes that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules and/or program codes stored in the storage circuit 102 to implement the method for improving a visual quality of a reality service content provided in the disclosure, which would be further discussed in the following.

Figure 2:
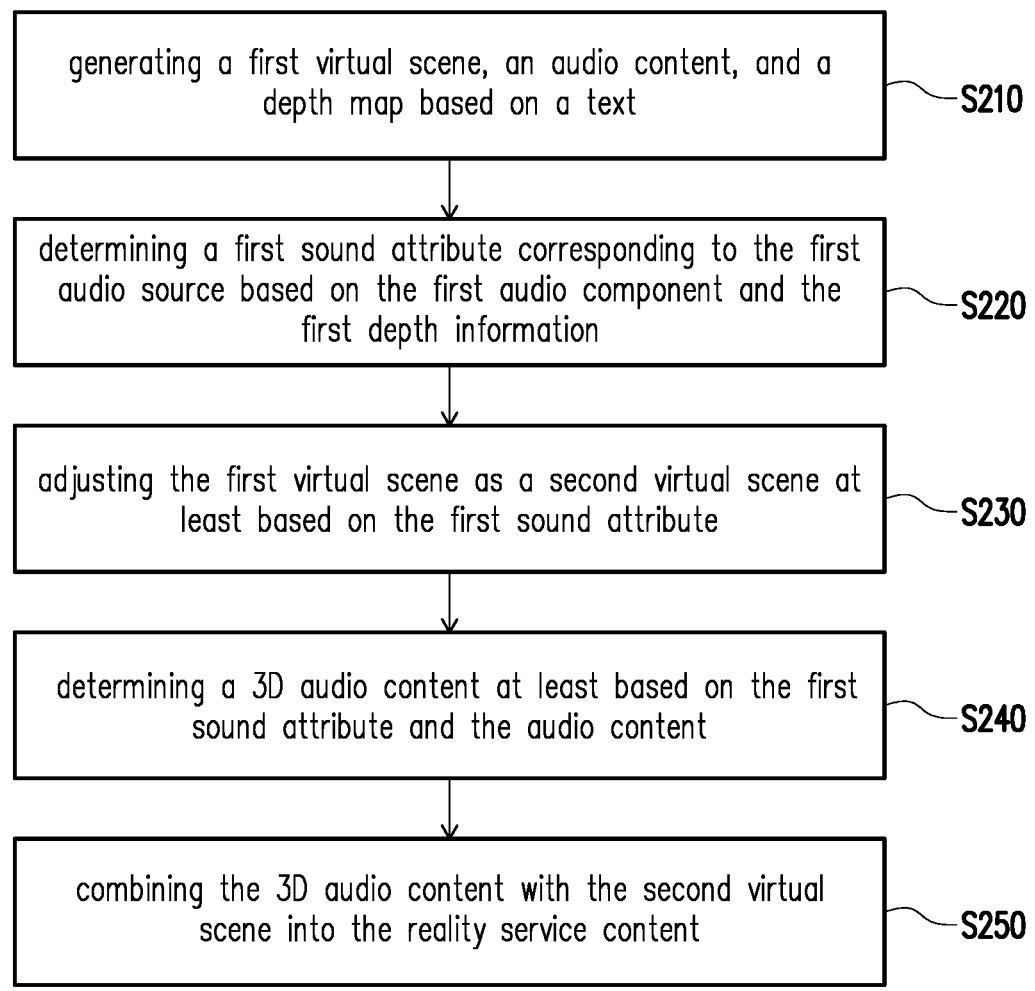
FIG. 2 shows a flow chart of the method for improving a visual quality of a reality service content according to an embodiment of the disclosure.

See FIG. 2, which shows a flow chart of the method for improving a visual quality of a reality service content according to an embodiment of the disclosure. The method of this embodiment may be executed by the host 100 in FIG. 1, and the details of each step in FIG. 2 will be described below with the components shown in FIG. 1.

In step S210, the processor 104 generates a first virtual scene, an audio content, and a depth map based on a text.

In one embodiment, the processor 104 inputs the text into at least one pre-trained generative adversarial network (GAN), and the at least one GAN can output the first virtual scene, the audio content, and the depth map in response to the text.

In various embodiments, the text can be any combination of descriptions, words, characters, terminologies corresponding to the virtual scene which the designer would like to design, but the disclosure is not limited thereto.

In the embodiments of the disclosure, how the at least one GAN generates the first virtual scene, the audio content, and the depth map in response to the text can be referred to the related existing documents.

In one embodiment, the at least one GAN can include a first GAN for generating 2D images in response to the text. In the general concept of GAN, the generated 2D images can be understood as fake images created by the first GAN in response to the text, and the details can be referred to the so-called "text to image" technology, but the disclosure is not limited thereto.

In one embodiment, the processor 104 can generate the depth map based on the 2D image generated by the first GAN. For example, the processor 104 can determine the depth map corresponding to the 2D image by using the mechanism of "Depth Estimation", but the disclosure is not limited thereto.

In one embodiment, the at least one GAN can include a second GAN for generating the depth map(s) in response to the text. In addition, the at least one GAN can include a third GAN for generating the audio content in response to the text.

Since the 2D images, the depth map(s), and the audio content are generated in response to the text, there would be corresponding relationships between the 2D images, the depth map, and the audio content. For example, for one of the 2D images, one of the depth maps generated by the second GAN would correspond to this 2D image, and one piece of the audio content generated by the third GAN would corresponding to this 2D image as well, but the disclosure is not limited thereto.

In one embodiment, the at least one GAN can include a fourth GAN for generating a 3D model and/or a 3D scene as the first virtual scene in response to the text.

In one embodiment, after obtaining the 2D images by the first GAN and the corresponding depth maps by the second GAN, the processor 104 can accordingly determine the corresponding 3D scene based on the 2D images and the corresponding depth maps.

Figure 3:
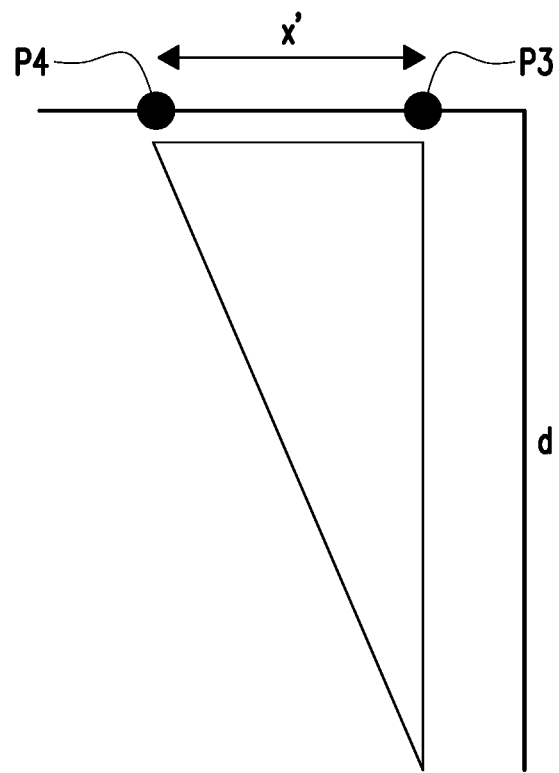
FIG. 3 shows a schematic diagram of determining a 3D scene according to an embodiment of the disclosure.
Figure 3:
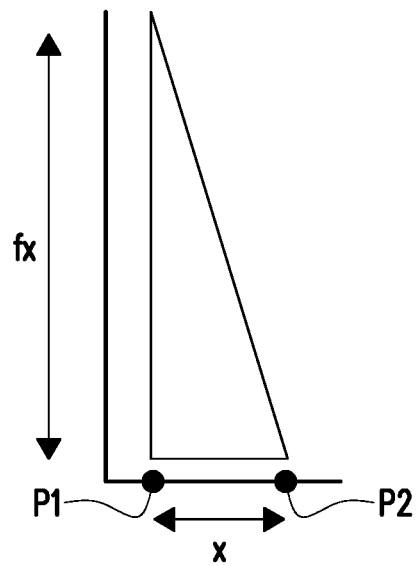

See FIG. 3, which shows a schematic diagram of determining a 3D scene according to an embodiment of the disclosure. In FIG. 3, assuming that the considered 2D image includes a first pixel P1 and a second pixel P2, and the 3D scene to be determined based on the 2D image includes a third pixel P3 and a fourth pixel P4.

In this case, the processor 104 can obtain a first distance x between the first pixel P1 and the second pixel P2, wherein the first distance x can be represented in pixels, but the disclosure is not limited thereto. In addition, the processor 104 can obtain a specific depth d corresponding to the third pixel P3 and the fourth pixel P4 from the depth map corresponding to the considered 2D image. Next, the processor 104 can determine a second distance x' between the third pixel P3 and the fourth pixel P4 based on an intrinsic parameter, the specific depth d, and the first distance x.

In one embodiment, the intrinsic parameter may be a focal length of the camera 101 of the host 100, and the second distance x' can be characterized by:

$$x' = \frac{x * d}{fx},$$

wherein fx is the focal length of the camera 101 of the host 100, but the disclosure is not limited thereto.

In some embodiments, during generating the first virtual scene, the processor 104 can be configured to perform: generating a plurality of scene contents based on the text; and generating the first virtual scene via stitching the scene contents.

In a first embodiment, the scene contents can be the 2D images generated by the first GAN in response to the text. In this case, the processor 104 can generate the first virtual scene via stitching the 2D images. In the first embodiment, the 2D images can be stitched to form a 360-degree or a 720-degree panorama as the first virtual scene, but the disclosure is not limited thereto.

In a second embodiment, the scene contents can be the 3D scenes generated by the fourth GAN in response to the text or the 3D scenes generated based on 2D images and the corresponding depth maps, but the disclosure is not limited thereto. In this case, the processor 104 can generate the first virtual scene via stitching the 3D scenes.

In the first embodiment and/or the second embodiment, the scene contents can be stitched by using the conventional image stitching mechanism, and the details thereof can be referred to the related existing documents.

In some cases, the scene contents (e.g., the 2D images or the 3D scenes) may not be properly stitched, such that the visual quality provided by the first virtual scene may not be satisfying. In the embodiments of the disclosure, the first virtual scene can be adjusted to provide a better visual quality based on the solution provided by the disclosure, which would be introduced later.

In the embodiments of the disclosure, the audio content includes a first audio component corresponding to a first audio source in the first virtual scene, and the depth map comprises first depth information corresponding to the first audio source.

In this case, in step S220, the processor 104 determines a first sound attribute corresponding to the first audio source based on the first audio component and the first depth information. In one embodiment, the first sound attribute includes a first sound direction corresponding to the first audio source.

In one embodiment, in response to determining that the first audio component in the audio content corresponds to the first audio source, the processor 104 can accordingly retrieve the corresponding depth information from the depth map as the first depth information.

For example, if the processor 104 determines that the first audio component corresponds to a specific part of the depth map, the processor 104 may regard the specific part of the depth map as the first depth information and accordingly determine the first sound direction.

For example, if the specific part of the depth map locates at the upper-left region of the depth map, the processor 104 may determine that the first sound direction is the direction originates from the upper-left region of the depth map to the user representative object. For another example, if the specific part of the depth map locates at the lower-right region of the depth map, the processor 104 may determine that the first sound direction is the direction originates from the lower-right region of the depth map to the user representative object, but the disclosure is not limited thereto.

In step S230, the processor 104 adjusts the the first virtual scene as a second virtual scene at least based on the first sound attribute.

In one embodiment, assuming that the scene contents being stitched includes a first scene content and a second content, wherein the first scene content and the second scene content both includes the first audio source.

In this case, if the first scene content and the second content are properly stitched, there would be one first audio source existing in the first virtual scene. However, if the first scene content and the second content are not properly stitched, there would be multiple first audio sources existing in the first virtual scene, which would degrade the visual quality of the first virtual scene.

As mentioned in the above, the first virtual scene can be adjusted to provide better visual quality based on the solution of the disclosure, and the details would be introduced in the following.

In one embodiment, in response to determining that both of the first scene content and the second scene content comprise the first audio source, the processor 104 can determine whether the first sound attribute corresponding to the first audio source in each of the first scene content and the second scene content are aligned after the first scene content and the second scene content are stitched to form a part of the first virtual scene. If yes, it represents that the first scene content and the second scene content are properly stitched; if not, it represents that the first scene content and the second scene content are not properly stitched.

In one embodiment, in response to determining that the first sound attribute corresponding to the first audio source in each of the first scene content and the second scene content are not aligned, the processor 104 may adjust the first virtual scene via aligning the first sound attribute corresponding to the first audio source in the first scene content with the first sound attribute corresponding to the first audio source in the second scene content. In this case, the adjusted first virtual scene (i.e., the second virtual scene) can provide a better visual quality.

Figure 4:
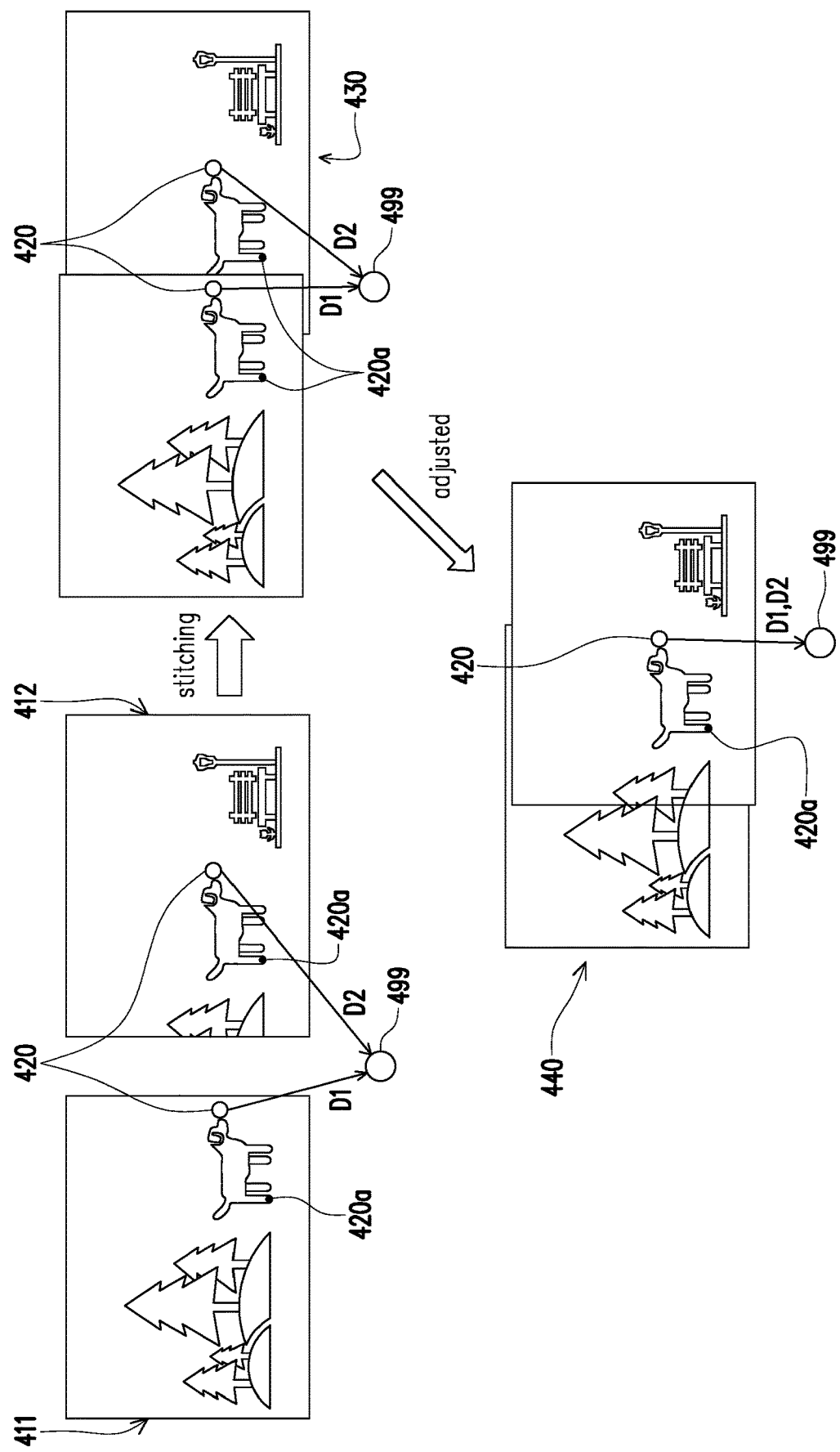
FIG. 4 shows a schematic diagram of adjusting virtual scene according to the first embodiment of the disclosure.

See FIG. 4, which shows a schematic diagram of adjusting virtual scene according to the first embodiment of the disclosure. In FIG. 4, assuming the considered first scene content and the second scene content are 2D images 411 and 412, but the disclosure is not limited thereto. In the embodiment, both of the 2D images 411 and 412 include an audio source 420, which may correspond to a mouth of a dog.

In FIG. 4, the audio source 420 in the 2D image 411 can be determined with a sound direction D1, which originates from the audio source 420 in the 2D image 411 to the user representative object 499. In the embodiment, the user representative object 499 may correspond to the viewing angle of the user, but the disclosure is not limited thereto. Similarly, the audio source 420 in the 2D image 412 can be determined with a sound direction D2, which originates from the audio source 420 in the 2D image 412 to the user representative object 499.

In the first embodiment, the 2D images 411 and 412 can be stitched to form a part of the first virtual scene 430. As can be seen in the first virtual scene 430, the sound directions D1 and D2 are not aligned, which represents that the 2D images 411 and 412 are not properly stitched.

In this case, the processor 104 can adjusting the first virtual scene 430 via aligning the sound direction D1 with the sound direction D2. The adjusted first virtual scene 430 can be characterized by the second virtual scene 440, wherein the directions D1 and D2 are aligned. Accordingly, the visual quality can be improved.

In the first embodiment, for improving the performance of stitching, the processor 104 can further consider aligning the sound directions corresponding to another audio source 420a in the 2D images 411 and 412. The details can be referred to the above descriptions, which would not be repeated herein.

Figure 5:
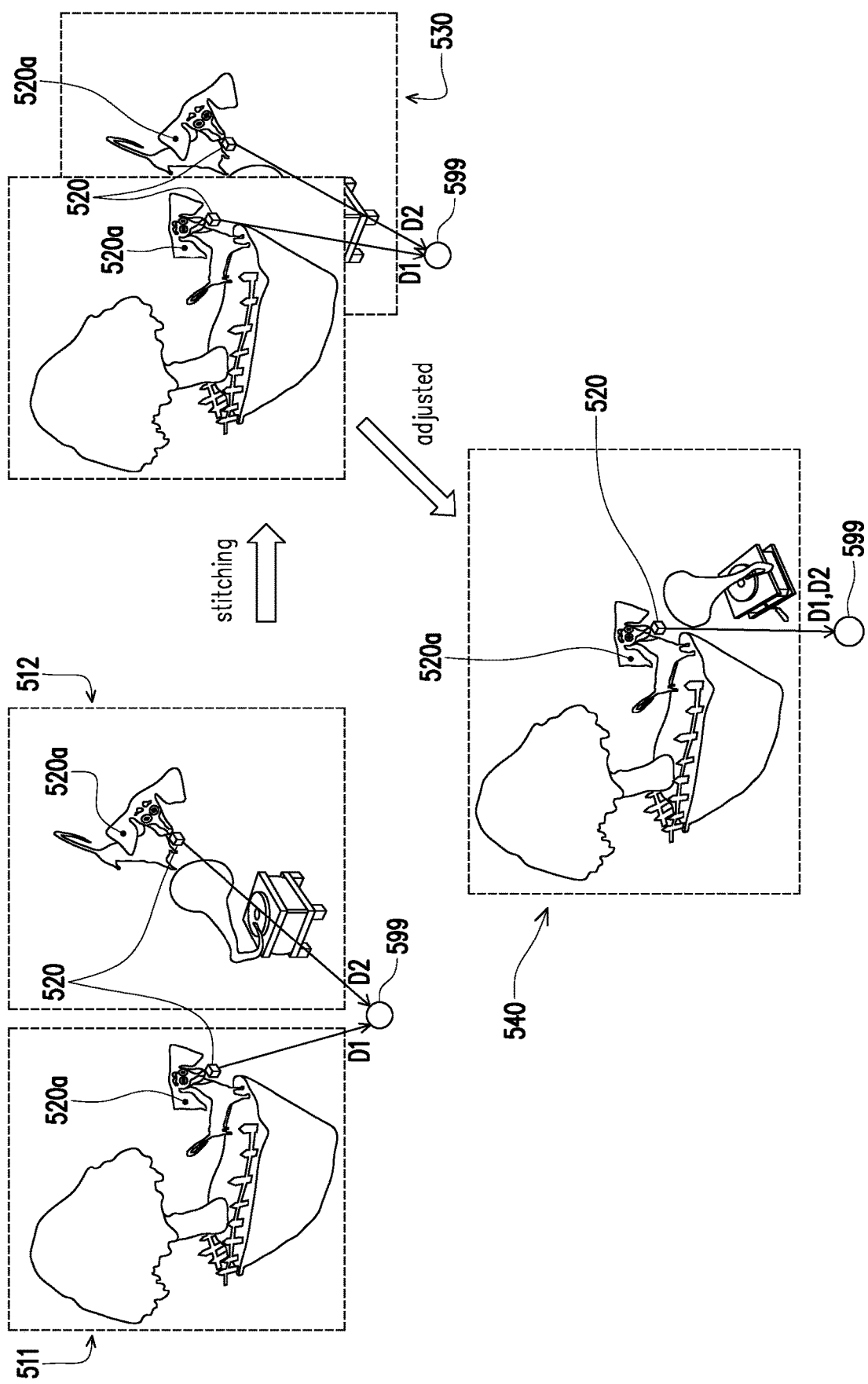
FIG. 5 shows a schematic diagram of adjusting virtual scene according to the second embodiment of the disclosure.

See FIG. 5, which shows a schematic diagram of adjusting virtual scene according to the second embodiment of the disclosure. In FIG. 5, assuming the considered first scene content and the second scene content are 3D scenes 511 and 512, but the disclosure is not limited thereto. In the embodiment, both of the 3D scenes 511 and 512 include an audio source 520, which may correspond to a mouth of a dog.

In FIG. 5, the audio source 520 in the 3D scene 511 can be determined with a sound direction D1, which originates from the audio source 520 in the 3D scene 511 to the user representative object 599. In the embodiment, the user representative object 599 may correspond to the viewing angle of the user, but the disclosure is not limited thereto. Similarly, the audio source 520 in the 3D scene 512 can be determined with a sound direction D2, which originates from the audio source 520 in the 3D scene 512 to the user representative object 599.

In the second embodiment, the 3D scenes 511 and 512 can be stitched to form a part of the first virtual scene 530. As can be seen in the first virtual scene 530, the sound directions D1 and D2 are not aligned, which represents that the 3D scenes 511 and 512 are not properly stitched.

In this case, the processor 105 can adjusting the first virtual scene 530 via aligning the sound direction D1 with the sound direction D2. The adjusted first virtual scene 530 can be characterized by the second virtual scene 540, wherein the directions D1 and D2 are aligned. Accordingly, the visual quality can be improved.

In the second embodiment, for improving the performance of stitching, the processor 104 can further consider aligning the sound directions corresponding to another audio source 520a in the 3D scenes 511 and 512. The details can be referred to the above descriptions, which would not be repeated herein.

Figure 6:
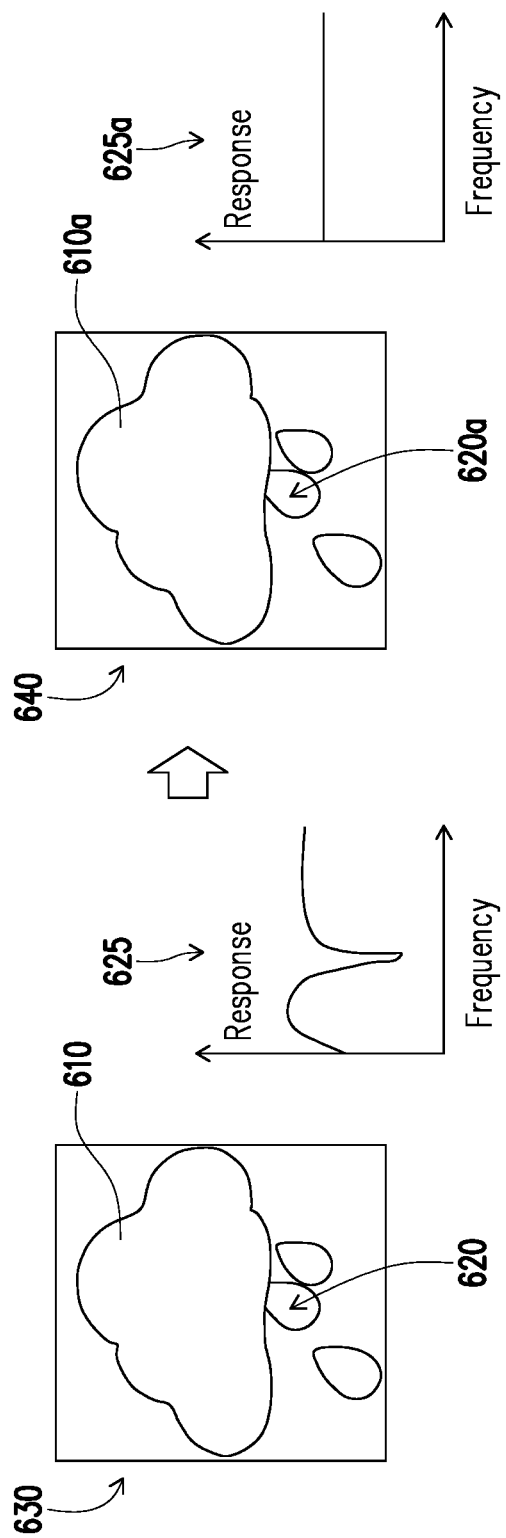
FIG. 6 shows a schematic diagram of adjusting virtual scene according to a third embodiment of the disclosure.

See FIG. 6, which shows a schematic diagram of adjusting virtual scene according to a third embodiment of the disclosure. In FIG. 6, the first virtual scene 630 is assumed to include a specific object 610 (which may be a rendered cloud) having the audio source 620, wherein the audio source 620 may be a raindrop of the rendered cloud.

In the embodiment, the processor 104 may obtain the sound response 625 of the audio source 620 and determine whether the sound response 625 meets a predetermined condition. In one embodiment, if the audio source 620 is properly rendered (e.g., having a smooth surface), the corresponding sound response should be smooth.

However, as can be seen from FIG. 6, the sound response 625 is not smooth (e.g., having a rough surface), and hence the processor 104 may determine that the sound response 625 fails to meet the predetermined condition due to being not smooth, but the disclosure is not limited thereto.

In this case, the processor 104 may modify the sound response 625 of the audio source 620 in the first virtual scene 630 to meet the predetermined condition via modifying the specific object 610. For example, the processor 104 may modify the specific object 610 in the first virtual scene 630 to the specific object 610a having an audio source 620a with a smoother surface in the second virtual scene 640, which corresponds to the sound response 625a.

Accordingly, the audio source 620 having rough surface can be modified to be the audio source 620a having a smoother surface, which improves the visual quality.

Figure 7:
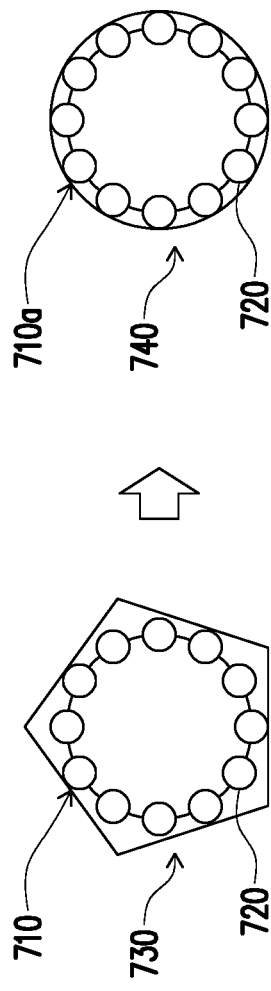
FIG. 7 shows a schematic diagram of adjusting virtual scene according to a fourth embodiment of the disclosure.

See FIG. 7, which shows a schematic diagram of adjusting virtual scene according to a fourth embodiment of the disclosure. In FIG. 7, the first virtual scene 730 is assumed to include a specific object 710 (which may be a rendered drum) having multiple audio sources 720, wherein the audio sources 720 may be the surrounding of the drumhead.

In the embodiment, it can be seen that the specific object 710 is rendered as a pentagonal object, which is inconsistent with the shape (e.g., a circle) formed by the audio sources 720. In this case, the processor 104 may determine that some specific parts of the specific object 710 fail to correspond to the sound attributes (e.g., sound directions) of the audio sources 720. For example, the processor 104 may determine that the regions between the circle formed by the audio sources 720 and the outline of the specific object 710 are the considered specific parts of the specific object 710.

In this case, the processor 104 may adjusting the first virtual scene 730 to the second virtual scene 740 via removing the specific parts from the specific object 710. As can be seen from the second virtual scene 740, the appearance of the specific object 710a (i.e., the specific object 710 whose specific parts have been removed) can match the circle formed by the audio sources 720, which provides a better visual quality.

Referring back to FIG. 2, in step S240, the processor 104 determining a 3D audio content at least based on the first sound attribute and the audio content.

In the embodiment, the processor 104 can determine the sound direction of each audio source based on the depth map based on the descriptions in the above embodiments, and accordingly determine the 3D audio content, which indicates the corresponding relationships between the audio sources and the corresponding sound directions and audio components.

In step S250, the processor 104 combines the 3D audio content with the second virtual scene into the reality service content.

In the embodiment, the mechanisms of combining the 3D audio content with the second virtual scene into the reality service content can be referred to documents related to various reality services, such as VR services.

In the embodiments of the disclosure, the provided solution can allow the user to create the reality service content by simply inputting desired texts, which reduces the difficulty and cost of producing the contents of reality services.

The disclosure further provides a computer readable storage medium for executing the method for improving a visual quality of a reality service content. The computer readable storage medium is composed of a plurality of program instructions (for example, a setting program instruction and a deployment program instruction) embodied therein. These program instructions can be loaded into the host 100 and executed by the same to execute the method for improving a visual quality of a reality service content and the functions of the host 100 described above.

In summary, the embodiments of the disclosure can generate the first virtual scene and the corresponding audio content and depth map based on inputted texts. In addition, the first virtual scene can be adjusted based on the sound attribute (e.g., sound directions) of audio sources therein. For example, the sound attributes of particular sound sources can be used to better stitch some scene contents that are not properly stitched. In addition, for some objects (e.g., objects with rough surfaces and/or objects having redundant image regions) not properly rendered in the first virtual scene, the sound attributes of particular sound sources can be used to better render these objects, such that a better visual quality can be provided.

Accordingly, the provided solution can allow the user to create the reality service content with satisfying visual quality by simply inputting desired texts, which reduces the difficulty and cost of producing the contents of reality services.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for improving a visual quality of a reality service content, adapted to a host, comprising:
    generating a first virtual scene, an audio content, and a depth map based on a text, wherein the audio content comprises a first audio component and the depth map comprises first depth information;
    determining a first sound attribute corresponding to a first audio source based on the first audio component and the first depth information;
    adjusting the first virtual scene as a second virtual scene at least based on the first sound attribute,
    wherein the step of adjusting the first virtual scene comprises:
        identifying a visual inconsistency within the first virtual scene by referencing the first sound attribute; and
        modifying the first virtual scene into the second virtual scene to resolve the visual inconsistency and improve the visual quality of the reality service content;
    determining a 3D audio content at least based on the first sound attribute and the audio content; and
    combining the 3D audio content with the second virtual scene into the reality service content.

2. The method according to claim 1, wherein the virtual scene, the audio content, and the depth map are generated by at least one generative adversarial network in response to the text.

3. The method according to claim 1, further comprising:
    generating a 2D image based on the text, and generating the depth map based on the 2D image.

4. The method according to claim 1, wherein the step of generating the first virtual scene based on the text comprises:
    generating a plurality of scene contents based on the text;

generating the first virtual scene via stitching the scene contents.

5. The method according to claim 4, wherein the first sound attribute comprises a first sound direction corresponding to the first audio source, the scene contents comprise a first scene content and a second scene content, and the step of adjusting the first virtual scene as a second virtual scene at least based on the first sound attribute comprises:
   in response to determining that both of the first scene content and the second scene content comprise the first audio source, determining whether the first sound attribute corresponding to the first audio source in each of the first scene content and the second scene content are aligned after the first scene content and the second scene content are stitched to form a part of the first virtual scene;
   in response to determining that the first sound attribute corresponding to the first audio source in each of the first scene content and the second scene content are not aligned, adjusting the first virtual scene via aligning the first sound attribute corresponding to the first audio source in the first scene content with the first sound attribute corresponding to the first audio source in the second scene content.

6. The method according to claim 4, wherein the scene contents are 2D images or 3D scenes.

7. The method according to claim 4, wherein the scene content comprises a 3D scene, and the step of generating the scene contents based on the text comprises:
   generating a 2D image based on the text and obtaining the corresponding depth map; and
   determining the 3D scene based on the 2D image and the corresponding depth map.

8. The method according to claim 7, wherein the 2D image comprises a first pixel and a second pixel, the 3D scene comprises a third pixel and a fourth pixel respectively corresponding to the first pixel and the second pixel, and the step of determining the 3D model based on the 2D image and the specific depth information comprises:
   obtaining a first distance between the first pixel and the second pixel;
   obtaining a specific depth corresponding to the third pixel and the fourth pixel from the depth map corresponding to the 2D image; and
   determining a second distance between the third pixel and the fourth pixel based on an intrinsic parameter, the specific depth, and the first distance.

9. The method according to claim 8, wherein the intrinsic parameter is a focal length of a camera of the host, and the second distance is characterized by:

$$x' = \frac{x * d}{fx},$$

wherein x' is the second distance, x is the first distance, d is the specific depth, and fx is the focal length of the camera of the host.

10. The method according to claim 1, wherein the first virtual scene comprises a specific object corresponding to the first audio source, and the step of adjusting the first virtual scene as the second virtual scene at least based on the first sound attribute comprises:
    in response to determining that a specific part of the specific object fails to correspond to the first sound attribute, adjusting the first virtual scene via removing the specific part from the specific object.

11. The method according to claim 1, wherein the first virtual scene comprises a specific object having the first audio source, and the step of adjusting the first virtual scene as the second virtual scene at least based on the first sound attribute comprises:
    in response to determining that a sound response of the first audio source fails to meet a predetermined condition, modifying the sound response of the first audio source to meet the predetermined condition via modifying the specific object.

12. A host, comprising:
    a storage circuit, storing a program code; and
    a processor, coupled to the storage circuit and accessing the program code to perform:
    generating a first virtual scene, an audio content, and a depth map based on a text, wherein the audio content comprises a first audio component and the depth map comprises first depth information;
    determining a first sound attribute corresponding to a first audio source based on the first audio component and the first depth information;
    adjusting the first virtual scene as a second virtual scene at least based on the first sound attribute,
    wherein the step of adjusting the first virtual scene comprises:
        identifying a visual inconsistency within the first virtual scene by referencing the first sound attribute; and
        modifying the first virtual scene into the second virtual scene to resolve the visual inconsistency and improve the visual quality of the reality service content;
    determining a 3D audio content at least based on the first sound attribute and the audio content; and
    combining the 3D audio content with the second virtual scene into a reality service content.

13. The host according to claim 12, wherein the processor performs:
    generating a plurality of scene contents based on the text;
    generating the first virtual scene via stitching the scene contents.

14. The host according to claim 13, wherein the first sound attribute comprises a first sound direction corresponding to the first audio source, the scene contents comprise a first scene content and a second scene content, and the processor performs:
    in response to determining that both of the first scene content and the second scene content comprise the first audio source, determining whether the first sound attribute corresponding to the first audio source in each of the first scene content and the second scene content are aligned after the first scene content and the second scene content are stitched to form a part of the first virtual scene;
    in response to determining that the first sound attribute corresponding to the first audio source in each of the first scene content and the second scene content are not aligned, adjusting the first virtual scene via aligning the first sound attribute corresponding to the first audio source in the first scene content with the first sound attribute corresponding to the first audio source in the second scene content.

15. The host according to claim 13, wherein the scene content comprises a 3D model, and the processor performs:

generating a 2D image based on the text and obtaining the corresponding depth map; and determining the 3D model based on the 2D image and the corresponding depth map.

16. The host according to claim 15, wherein the 2D image comprises a first pixel and a second pixel, the 3D scene comprises a third pixel and a fourth pixel respectively corresponding to the first pixel and the second pixel, and the processor performs:

obtaining a first distance between the first pixel and the second pixel;

obtaining a specific depth corresponding to the third pixel and the fourth pixel from the depth map corresponding to the 2D image; and determining a second distance between the third pixel and the fourth pixel based on an intrinsic parameter, the specific depth, and the first distance.

17. The host according to claim 16, wherein the host further comprises a camera coupled to the processor, the intrinsic parameter is a focal length of the camera of the host, and the second distance is characterized by:

$$x' = \frac{x*d}{fx},$$

wherein x' is the second distance, x is the first distance, d is the specific depth, and fx is the focal length of the camera of the host.

18. The host according to claim 12, wherein the first virtual scene comprises a specific object corresponding to the first audio source, and the processor performs:

in response to determining that a specific part of the specific object fails to correspond to the first sound attribute, adjusting the first virtual scene via removing the specific part from the specific object.

19. The host according to claim 12, wherein the first virtual scene comprises a specific object having the first audio source, and the processor performs:

in response to determining that a sound response of the first audio source fails to meet a predetermined condition, modifying the sound response of the first audio source to meet the predetermined condition via modifying the specific object.

20. A non-transitory computer readable storage medium, the computer readable storage medium recording an executable computer program, the executable computer program being loaded by a host to perform steps of:

generating a first virtual scene, an audio content, and a depth map based on a text, wherein the audio content comprises a first audio component, and the depth map comprises first depth information;

determining a first sound attribute corresponding to a first audio source based on the first audio component and the first depth information;

adjusting the first virtual scene as a second virtual scene at least based on the first sound attribute, wherein the step of adjusting the first virtual scene comprises:

identifying a visual inconsistency within the first virtual scene by referencing the first sound attribute; and modifying the first virtual scene into the second virtual scene to resolve the visual inconsistency and improve the visual quality of the reality service content;

determining a 3D audio content at least based on the first sound attribute and the audio content;

combining the 3D audio content with the second virtual scene into a reality service content.

* * * * *